United States Patent
Heo et al.

(10) Patent No.: US 8,669,020 B2
(45) Date of Patent: Mar. 11, 2014

(54) MEMBRANE ELECTRODE ASSEMBLY COMPRISING A HYDROGEN PERMEABLE THIN FILM, SOLID OXIDE FUEL CELL COMPRISING THE SAME AND METHOD OF PREPARING THE MEMBRANE ELECTRODE ASSEMBLY

(75) Inventors: Pil-won Heo, Yongin-si (KR); Yoon-ho Lee, Seoul (KR); Sang-kyun Kang, Seoul (KR); Jin-su Ha, Seoul (KR); Suk-won Cha, Seoul (KR)

(73) Assignees: Samsung Electronics Co., Ltd. (KR); Snu R&DB Foundation (KR)

( * ) Notice: Subject to any disclaimer, the term of this patent is extended or adjusted under 35 U.S.C. 154(b) by 317 days.

(21) Appl. No.: 13/172,131

(22) Filed: Jun. 29, 2011

(65) Prior Publication Data

US 2012/0088180 A1   Apr. 12, 2012

(30) Foreign Application Priority Data

Oct. 12, 2010   (KR) ................. 10-2010-0099543

(51) Int. Cl.
*H01M 8/00*  (2006.01)
*H01M 8/10*  (2006.01)
*B05D 5/12*  (2006.01)

(52) U.S. Cl.
USPC ........... 429/485; 429/535; 429/532; 429/488; 429/483; 429/481; 427/115

(58) Field of Classification Search
USPC ......... 429/304, 409, 481, 458, 483, 485, 488, 429/535, 532; 427/115; 205/239; 216/13
See application file for complete search history.

(56) References Cited

U.S. PATENT DOCUMENTS

| 6,428,920 | B1 * | 8/2002 | Badding et al. ............... 429/458 |
| 7,491,462 | B2 | 2/2009 | Ito et al. |
| 2004/0043277 | A1 * | 3/2004 | Ito et al. ......................... 429/34 |
| 2007/0284257 | A1 * | 12/2007 | Fukunaka et al. ............ 205/239 |
| 2009/0181266 | A1 * | 7/2009 | Park et al. ........................ 429/12 |
| 2009/0218311 | A1 * | 9/2009 | Jiang et al. ..................... 216/13 |
| 2010/0101419 | A1 | 4/2010 | Hoshino et al. |

FOREIGN PATENT DOCUMENTS

| JP | 2005-19041 | 1/2005 |
| JP | 2007-173104 | 7/2007 |
| JP | 2007-268404 | 10/2007 |
| JP | 2008-43907 | 2/2008 |
| JP | 2009-22946 | 2/2009 |
| JP | 2010-70818 | 4/2010 |

OTHER PUBLICATIONS

Machine Translation of: JP 2005/019041, Yamaguchi, Jan. 20, 2005.*
Machine Translation of: JP 2007/173104, Kanda et al., Jul. 5, 2007.*
Shim, et al., Intermediate-Temperature Ceramic Fuel Cells with Thin Film Yttrium-Doped Barium Zirconate Electrolytes, Chemistry of Materials Article, vol. 21, No. 14, 2009, pp. 3290-3296.

(Continued)

*Primary Examiner* — Kenneth Douyette
(74) *Attorney, Agent, or Firm* — Cantor Colburn LLP (57) ABSTRACT

A membrane electrode assembly including an anode that incorporates a porous support and a hydrogen permeable metal thin film disposed on the porous support; a cathode; and a proton conductive solid oxide electrolyte membrane disposed between the anode and the cathode.

25 Claims, 6 Drawing Sheets

(56) References Cited

OTHER PUBLICATIONS

Ito, et al., New intermediate temperature fuel cell with ultra-thin proton conductor electrolyte, Journal of Power Sources, 152 (2005) pp. 200-203.

K.D. Kreuer, Proton-Conducting Oxides, Annu. Rev. Mater. Res. 2003.33:333-359. Downloaded from arjournals.annualreviews.org by California Institute of Technology on Oct. 18, 2006. For personal use only.

* cited by examiner

OCV : 1.0V , Power density : 4.6mW/cm2

FIG. 5B

OCV : 0.97V , Power density : 9.1mW/cm2 ered. To maintain humidi-
MEMBRANE ELECTRODE ASSEMBLY COMPRISING A HYDROGEN PERMEABLE THIN FILM, SOLID OXIDE FUEL CELL COMPRISING THE SAME AND METHOD OF PREPARING THE MEMBRANE ELECTRODE ASSEMBLY

CROSS-REFERENCE TO RELATED APPLICATIONS

This application claims the benefit of Korean Patent Application No. 10-2010-0099543, filed on Oct. 12, 2010 in the Korean Intellectual Property Office, the disclosure of which is incorporated herein by reference.

BACKGROUND

1. Field

Aspects of the present disclosure relate to a membrane electrode assembly, a solid oxide fuel cell including the same and a method of preparing the membrane electrode assembly.

2. Description of the Related Art

As one type of alternative energy source, fuel cells are classified into polymer electrolyte membrane fuel cells (PEMFCs), phosphoric acid fuel cells (PAFCs), molten carbonate fuel cells (MCFCs), and solid oxide fuel cells (SOFCs), according to the type of electrolyte used.

SOFCs include as an electrolyte a solid oxide having ionic conductivity. SOFCs have high efficiency, excellent durability, and relatively low manufacturing costs, and can use a variety of fuels.

Since SOFCs that operate at a high temperature, between about 800 to about 1000° C., have high electrical efficiency and few restrictions in terms of the purity of fuel gases, a variety of fuels may be used. However, due to the high temperature operation, it is expensive to maintain the durability of SOFCs in a high temperature environment, and fast on-off performance is impossible.

PEMFCs that operate at about 80° C. may be applied to small-sized decentralized power supplies for automotive and home use and portable power supplies. However, in PEMFCs, the electrolyte membrane is a polymer membrane that should be humidified, and thus the conductivity of the fuel cells dramatically decreases at a temperature of 100° C. or greater at which temperature water evaporates. To maintain humidified conditions, PEMFCs require a humidifier and careful control of the humidifier according to operating conditions.

Therefore, there is a need to develop a fuel cell capable of operating at an intermediate temperature between about 150 to about 400° C. to overcome the drawbacks of SOFCs and PEMFCs.

SUMMARY

An aspect of the present invention provides a membrane electrode assembly.

An aspect of the present invention provides a solid oxide fuel cell including the membrane electrode assembly.

An aspect of the present invention provides a method of preparing the membrane electrode assembly.

According to an aspect of the present invention, a membrane electrode assembly includes: an anode that incorporates a porous support; a hydrogen permeable metal thin film disposed on the porous support; a cathode; and a proton conductive solid oxide electrolyte membrane disposed between the anode and the cathode.

According to another aspect of the present invention, a solid oxide fuel cell includes the membrane electrode assembly.

According to another aspect of the present invention, a method of preparing a membrane electrode assembly includes forming an anode by disposing a hydrogen permeable metal thin film on a porous support; disposing a solid oxide electrolyte membrane on the hydrogen permeable metal thin film; and disposing a cathode on the solid oxide electrolyte membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures. Moreover, it is to be understood that where is stated herein that one layer is "formed on" or "disposed on" a second layer, the first layer may be formed or disposed directly on the second layer or there may be an intervening layer between the first layer and the second layer. Further, as used herein, the term "formed on" is used with the same meaning as "located on" or "disposed on" and is not meant to be limiting regarding any particular fabrication process.

Hereinafter, a membrane electrode assembly, a solid oxide fuel cell including the same, and a method of preparing the membrane electrode assembly will be described in detail.

A membrane electrode assembly according to an embodiment of the present invention includes an anode that incorporates a porous support and a hydrogen permeable metal thin film disposed on the porous support; a cathode; and a proton conductive solid oxide electrolyte membrane disposed between the anode and the cathode.

Figure 1:
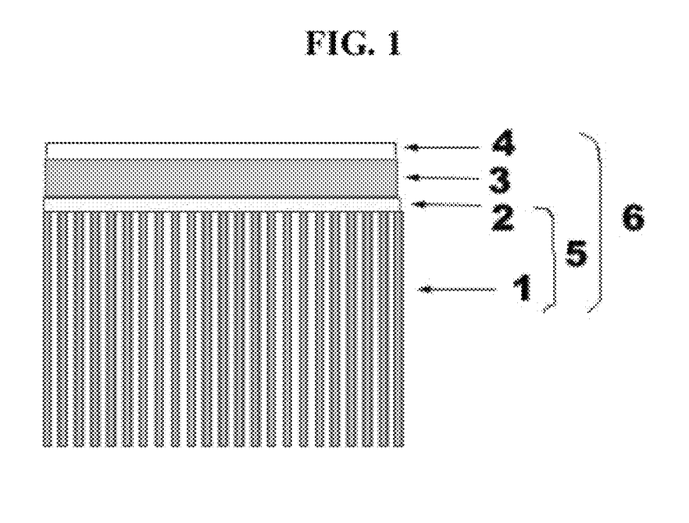
FIG. 1 shows a membrane electrode assembly according to an embodiment of the present invention.

For example, referring to FIG. 1, a membrane electrode assembly 6 may be prepared by forming an anode 5 by disposing a hydrogen permeable metal thin film 2 on a porous support 1, disposing a solid oxide electrolyte membrane 3 on the anode 5, and disposing a cathode 4 on the solid oxide electrolyte membrane 3. The solid oxide electrolyte membrane 3 is also known as a proton conductive solid oxide electrolyte membrane 3.

The hydrogen permeable metal thin film 2 is a dense metal thin film without pores, and hydrogen may permeate into the metal thin film by diffusion. Thus, hydrogen permeability of the hydrogen permeable metal thin film 2 may increase as the thickness of the hydrogen permeable metal thin film 2 decreases. For example, the hydrogen permeable metal thin film 2 may have a thickness of 1000 nm or less.

As the thickness of the hydrogen permeable metal thin film 2 decreases, the thickness of the solid oxide electrolyte membrane 3 may also decrease. The thickness of the solid oxide electrolyte membrane 3 may be equal to or less than 10 µm.

As the thicknesses of the hydrogen permeable metal thin film 2 and solid oxide electrolyte membrane 3 decrease, the membrane resistance of the membrane electrode assembly 6 decreases, and the diffusion rate of hydrogen increases. Thus, an electrode-electrolyte interface may have a high hydrogen concentration at a low temperature. As a result, the operation temperature of a fuel cell including the membrane electrode assembly 6 may be reduced. For example, a fuel cell including the membrane electrode assembly 6 may provide a high output-power at an intermediate temperature, for example, a temperature equal to or less than 400° C.

In the membrane electrode assembly 6, the thickness of the hydrogen permeable metal thin film 2 may be in the range of about 10 to about 1000 nm. For an example toward the lower end of the range, the thickness of the hydrogen permeable metal thin film 2 may be in the range of about 10 to about 500 nm. For another example toward the higher end of the range, the thickness of the hydrogen permeable metal thin film 2 may be in the range of about 100 to about 1000 nm. For yet another example, the thickness of the hydrogen permeable metal thin film 2 may be in the range of about 100 to about 500 nm.

The surface of the hydrogen permeable metal thin film 2 may have a root mean square (RMS) roughness in the range of about 1 to about 100 nm. For example, the RMS roughness of the surface of the hydrogen permeable metal thin film 2 may be in the range of about 1 to about 70 nm. For another example, the RMS roughness of the surface of the hydrogen permeable metal thin film 2 may be in the range of about 1 to about 40 nm. For yet another example, the RMS roughness of the surface of the hydrogen permeable metal 2 thin film may be in the range of about 1 to about 10 nm.

The hydrogen permeable metal may be any metal or alloy with high hydrogen permeability that is commonly used in the art. For example, the hydrogen permeable metal may include at least one metal or alloy selected from the group consisting of palladium (Pd); a Pd-silver (Ag) alloy; a Pd-copper (Cu) alloy; a Pd-based alloy such as a Pd-vanadium (V) alloy; niobium (Nb); a Nb-tungsten (W) alloy; a Nb-based alloy such as a Nb—W-molybdenum (Mo) alloy; vanadium (V); and a V-based alloy. In particular, the hydrogen permeable metal may include at least one metal or alloy selected from the group consisting of (Pd); a Pd-based alloy; niobium (Nb); a Nb-based alloy vanadium (V); and a V-based alloy.

The proton conductive solid oxide electrolyte membrane 3 may have a thickness in the range of about 0.1 to about 10 µm. For an example near the lower end of the range, the thickness of the proton conductive solid oxide electrolyte membrane 3 may be in the range of about 0.1 to about 5 µm. For another example near the lower end of the range, the thickness of the proton conductive solid oxide electrolyte membrane 3 may be in the range of about 0.1 to about 2 µm. For another example near the upper end of the range, the thickness of the proton conductive solid oxide electrolyte membrane 3 may be in the range of about 0.5 to about 10 µm. For another example, the thickness of the proton conductive solid oxide electrolyte membrane 3 may be in the range of about 0.5 to about 5 µm. For yet another example, the thickness of the proton conductive solid oxide electrolyte membrane 3 may be in the range of about 0.5 to about 2 µm.

In the membrane electrode assembly 6, the ratio of the thickness of the proton conductive solid oxide electrolyte membrane 3 to the thickness of the hydrogen permeable metal thin film 2 may be limited depending on the thickness of the hydrogen permeable metal thin film 2.

For example, the ratio of the thickness of the proton conductive solid oxide electrolyte membrane 3 to the thickness of the hydrogen permeable metal thin film 2 may be equal to or greater than 1.5:1, and the thickness of the hydrogen permeable metal thin film 2 may be equal to or greater than 400 nm.

For another example, the ratio of the thickness of the proton conductive solid oxide electrolyte membrane 3 to the thickness of the hydrogen permeable metal thin film 2 may be equal to or greater than 6:1, and the thickness of the hydrogen permeable metal thin film 2 may be equal to or greater than 200 nm or in the range of about 200 to about 400 nm.

For example, the ratio of the thickness of the proton conductive solid oxide electrolyte membrane 3 to the thickness of the hydrogen permeable metal thin film 2 may be equal to or greater than 12:1, and the thickness of the hydrogen permeable metal thin film 2 may be equal to or greater than 100 nm or in the range of about 100 to about 200 nm.

Under the above conditions, the hydrogen permeable metal thin film 2 does not have defects, thereby preventing the membrane electrode assembly 6 from being short-circuited.

The proton conductive solid oxide electrolyte membrane 3 may include at least one material selected from: zeolite substituted with a proton; β-alumina; silicon oxide doped with a bivalent or trivalent cation; and barium zirconate, barium cerate, strontium cerate, or strontium zirconate doped with a bivalent or trivalent cation; but is not limited thereto. For example, the proton conductive solid oxide may be yttria doped barium zirconate (BYZ).

In the membrane electrode assembly 6, the diameter of pores of the porous support 1 may be in the range of about 10 to about 100 nm. In addition, the thickness of the porous support 1 may be equal to or greater than 10 µm. However, the thickness and the pore diameter of the porous support 1 are not limited thereto and may be any thickness suitable for depositing the hydrogen permeable metal thin film 2.

For example, the porous support 1 may be formed of an anodic aluminum oxide (AAO), but is not limited thereto. Any compound that is commonly used in the art to form a porous support 1 may also be used.

In the membrane electrode assembly 6, a catalyst layer (not shown) may further be disposed between the anode 5 and the proton conductive solid oxide electrolyte membrane 3. The catalyst layer may catalyze oxidation of hydrogen in the interface between the anode 5 and the solid oxide electrolyte membrane 3.

The catalyst may include at least one metal catalyst selected from the group consisting of platinum (Pt), ruthenium (Ru), nickel (Ni), palladium (Pd), gold (Au), and silver (Ag); at least one oxide catalyst selected from the group consisting of $La_{1-x}Sr_xMnO_3(0<x<1)$, $La_{1-x}Sr_xCoO_3(0<x<1)$, and $La_{1-x}Sr_xCo_{1-y}FeO_3(0<x<1, 0<y<1)$; and alloys thereof: For example, the catalyst may be platinum (Pt).

In the membrane electrode assembly 6, the cathode 4 may include at least one selected from the group consisting of: platinum (Pt); nickel (Ni); palladium (Pd); silver (Ag); perovskite doped with at least one selected from the group consisting of lanthanum (La), strontium (Sr), barium (Ba), and cobalt (Co); zirconia doped with yttrium (Y) or scandium (Sc); ceria doped with at least one selected from the group consisting of gadolinium, samarium, lanthanium, ytterbium, and neodymium; at least one proton conductive metal including Pd. Pd—Ag alloy, and vanadium (V); zeolite; strontium manganate doped with lanthanum (La) (LSM), calcium manganate doped with lanthanum (LCM), or lanthanum strontium cobalt ferrite (LSCF). For example, the cathode 4 may be platinum (Pt).

The thickness of the cathode 4 may be equal to or less than 1 μm, but is not limited thereto. The thickness of the cathode 4 may be suitable for providing output-power at an intermediate temperature. For example, the thickness of the cathode 4 may be in the range of about 10 to about 1000 nm.

A solid oxide fuel cell according to another embodiment of the present invention may include the membrane electrode assembly 6. The solid oxide fuel cell may provide a high power density at an intermediate temperature equal to or less than 400° C. due to the membrane electrode assembly 6.

A method of preparing a membrane electrode assembly 6 according to another embodiment of the present invention may include forming an anode 5 by disposing a hydrogen permeable metal thin film 2 on a porous support 1; disposing a solid oxide electrolyte membrane 3 on the hydrogen permeable metal thin film 2; and disposing a cathode 4 on the solid oxide electrolyte membrane 3.

According to the method, a membrane electrode assembly 6 including a hydrogen permeable metal thin film 2 with a thickness equal to or less than 1000 nm may be prepared.

According to the method, the cathode 4, the hydrogen permeable metal thin film 2, and the solid oxide electrolyte membrane 3 may be each independently deposited using at least one method selected from the group consisting of sputtering, chemical vapor deposition, physical vapor deposition, atomic layer deposition, pulsed laser deposition, molecular beam epitaxy, and vacuum deposition. Any method by which the thickness of the hydrogen permeable metal thin film 2 is controlled to be equal to or less than 1000 nm with an error level of 1 nm may be used.

The method may further include depositing a catalyst layer on the hydrogen permeable metal thin film 2. A fuel cell including the membrane electrode assembly 6 may have high efficiency by disposing the catalyst layer between the hydrogen permeable metal thin film 2 and the solid oxide electrolyte thin film 3.

According to the method, the catalyst layer may be deposited using at least one method selected from the group consisting of sputtering, chemical vapor deposition, physical vapor deposition, atomic layer deposition, plating, pulsed laser deposition, molecular beam epitaxy, and vacuum deposition.

According to the method, the thickness of the hydrogen permeable metal thin film 2 may be in the range of about 10 to about 1000 nm. For an example at the lower end of the range, the thickness of the hydrogen permeable metal thin film 2 may be in the range of about 10 to about 500 nm. For an example at the higher end of the range, the thickness of the hydrogen permeable metal thin film 2 may be in the range of about 100 to about 1000 nm. For another example, the thickness of the hydrogen permeable metal thin film 2 may be in the range of about 100 to about 500 nm.

According to the method, the surface of the hydrogen permeable metal thin film 2 may have an RMS roughness in the range of about 1 to about 100 nm. For example, the RMS roughness of the surface of the hydrogen permeable metal thin film 2 may be in the range of about 1 to about 70 nm. For another example, the RMS roughness of the surface of the hydrogen permeable metal thin film 2 may be in the range of about 1 to about 40 nm. For yet another example, the RMS roughness of the surface of the hydrogen permeable metal thin film 2 may be in the range of about 1 to about 10 nm.

According to the method, the hydrogen permeable metal or alloy may include at least one metal or alloy selected from the group consisting of Pd, a Pd-based alloy, Nb, a Nb-based alloy, V, and a V-based alloy.

According to the method, the thickness of the proton conductive solid oxide electrolyte membrane 3 may be in the range of about 0.1 to about 10 μm. For example, the thickness of the proton conductive solid oxide electrolyte membrane 3 may be in the range of about 0.1 to about 10 μm. For another example, the thickness of the proton conductive solid oxide electrolyte membrane 3 may be in the range of about 0.1 to about 5 μm. For yet another example, the thickness of the proton conductive solid oxide electrolyte membrane 3 may be in the range of about 0.1 to about 2 μm.

According to the method, the diameter of pores of the porous support 1 may be in the range of about 10 to about 100 nm.

Aspects of the present invention will now be described in further detail with reference to the following examples. However, these examples are not intended to limit the scope of the one or more embodiments of the present invention.

Example 1

Preparation of Membrane Electrode Assembly

A porous anode aluminum oxide (AAO) disc having a diameter of 13 or 25 mm, a thickness of 100 μm, and a pore diameter of 80 nm was used as a porous support.

Then, Pd was deposited on the porous support to a thickness of 400 nm to form an anode. The anode was deposited by sputtering using high-purity Pd as a target for 25 minutes at a sputtering power of 200 W at a target-substrate interval of 80 mm and at an Ar pressure of 5 mTorr.

Then, a BYZ thin film was deposited on the anode to a thickness of 1.2 μm as a solid oxide electrolyte. The solid oxide electrolyte membrane was deposited by pulsed laser deposition (PLD) using $BaZr_{0.8}Y_{0.2}O_{3-d}$ (d is the oxygen deficiency per perovskite primitive unit cell) as a target for 160 minutes (about 48,000 pulses) at 600° C. at an oxygen pressure of 30 mTorr, at a laser power of 200 mJ at a laser frequency of 5 Hz, and at a target-substrate interval of 75 mm.

Then, a Pt thin film was deposited on the solid oxide electrolyte thin film to a thickness of 170 nm as a cathode. The cathode was deposited by sputtering using high-purity Pt as a target for 8 minutes at a sputtering power of 200 W at a target-substrate interval of 80 mm and at an Ar pressure of 5 mTorr. Thus, a membrane electrode assembly was prepared.

Example 2

A membrane electrode assembly was prepared in the same manner as in Example 1, except that the thickness of the Pd thin film, as an anode, was 200 nm.

Example 3

A membrane electrode assembly was prepared in the same manner as in Example 1, except that the thickness of the Pd thin film, as an anode, was 100 nm.

Example 4

A membrane electrode assembly was prepared in the same manner as in Example 1, except that the thickness of the solid oxide electrolyte thin film was 0.9 μm.

Example 5

A membrane electrode assembly was prepared in the same manner as in Example 2, except that the thickness of the solid oxide electrolyte thin film was 0.9 μm.

Example 6

A membrane electrode assembly was prepared in the same manner as in Example 3, except that the thickness of the solid oxide electrolyte thin film was 0.9 μm.

Example 7

A membrane electrode assembly was prepared in the same manner, as in Example 1, except that the thickness of the solid oxide electrolyte thin film was 0.6 μm.

Example 8

A membrane electrode assembly was prepared in the same manner as in Example 2, except that the thickness of the solid oxide electrolyte thin film was 0.6 μm.

Example 9

A membrane electrode assembly was prepared in the same manner as in Example 3, except that the thickness of the solid oxide electrolyte thin film was 0.6 μm.

Example 10

A membrane electrode assembly was prepared in the same manner as in Example 1, except that the thickness of the solid oxide electrolyte thin film was 0.3 μm.

Example 11

A membrane electrode assembly was prepared in the same manner as in Example 2, except that the thickness of the solid oxide electrolyte thin film was 0.3 μm.

Example 12

A membrane electrode assembly was prepared in the same manner as in Example 3, except that the thickness of the solid oxide electrolyte thin film was 0.3 μm.

Example 13

Adding Catalyst Layer

A porous anodic aluminum oxide (AAO) disc having a diameter of 13 mm, a thickness of 100 μm, and a pore diameter of 80 nm was used as a porous support.

Then, Pd was deposited on the porous support to a thickness of 320 nm to form an anode. The anode was deposited by sputtering using high-purity Pd as a target for 20 minutes at a sputtering power of 200 W at a target-substrate interval of 80 mm and at an Ar pressure of 5 mTorr.

Then, a Pt thin film was deposited on the anode to a thickness of 80 nm to form a catalyst layer. The catalyst layer was deposited by sputtering using high-purity Pt as a target for 4 minutes at a sputtering power of 200 W at a target-substrate interval of 80 mm and at an Ar pressure of 5 mTorr.

Then, a BYZ thin film was deposited on the anode to a thickness of 1.2 μm as a solid oxide electrolyte. The solid oxide electrolyte membrane was deposited by pulsed laser deposition (PLD) using $BaZr_{0.8}Y_{0.2}O_{3-d}$ (d is the oxygen deficiency per perovskite primitive unit cell) as a target for 160 minutes (about 48,000 pulses) at 600° C. at an oxygen pressure of 30 mTorr, at a laser power of 200 mJ at a laser frequency of 5 Hz and at a target-substrate interval of 75 mm.

Then, a Pt thin film was deposited on the solid oxide electrolyte thin film to a thickness of 130 nm as a cathode. The cathode was deposited by sputtering using high-purity Pt as a target for 6 minutes at a sputtering power of 200 W at a target-substrate interval of 80 mm and at an Ar pressure of 5 mTorr. Thus, a membrane electrode assembly was prepared.

Evaluation Example 1

Short-Circuit Test

Short-circuiting of the membrane electrode assemblies prepared according to Examples 1 to 12 was measured using an impedance analyzer. Three sizes of areas, 0.01, 0.023 and 0.04 $cm^2$ of each of the membrane electrode assemblies were prepared and tested. As the surface increases, the chance of short-circuiting increases.

Impedance was measured under open circuit voltage (OCV) and frequency sweep conditions over a frequency from 0.1 to 1 $10^6$ Hz at amplitudes of 10 mV.

When the resistance value linearly increases along an imaginary axis, and film resistance can be measured during the frequency sweep from a low frequency to a high frequency, it was considered that short-circuiting did not occur. When an inductive loop was found somewhere in the whole frequency range, it was considered that short-circuiting occurred.

As a result, short-circuiting did not occur at all in areas of the membrane electrode assemblies according to Examples 1 to 3. Short-circuiting did not occur at all in areas of the membrane electrode assemblies according to Example 4. Short-circuiting did not occur at 0.01 $cm^2$ areas of the membrane electrode assemblies according to Example 5. Short-circuiting did not occur at 0.01 and 0.023 $cm^2$ of the membrane electrode assemblies according to Example 7.

However, short-circuiting occurred in all areas of the membrane electrode assemblies according to Examples 10 to 12. In addition, short-circuiting occurred in all areas of the membrane electrode assemblies according to Examples 8 and 9.

Figure 2A:
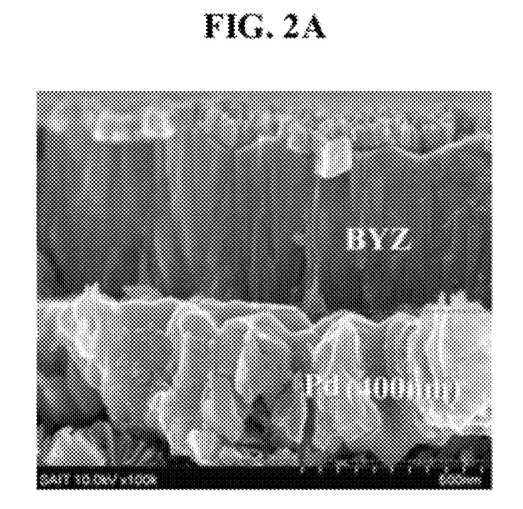
FIG. 2A is a scanning electron microscopic (SEM) image of a cross-section of a membrane electrode assembly prepared according to Example 7.
Figure 2B:
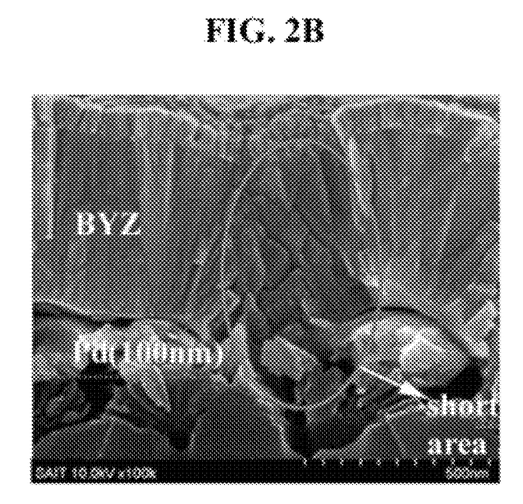
FIG. 2B is an SEM image of a cross-section of a membrane electrode assembly prepared according to Example 9.

As shown in FIG. 2A, in the membrane electrode assembly according to Example 7, there is no defect in the Pd thin film having a thickness of 400 nm. However, defects occurred in the Pd thin film having a thickness of 100 nm in the membrane electrode assembly according to Example 9 as shown in FIG. 2B, and thus short-circuiting occurred.

Figure 3A:
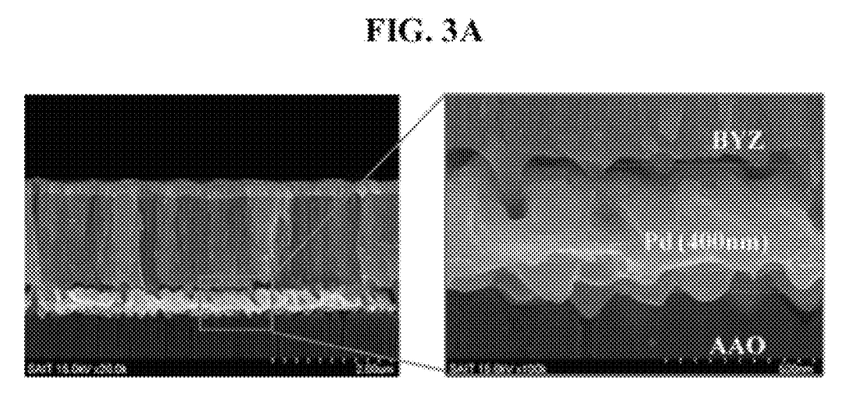
FIG. 3A is an SEM image of a cross-section of a membrane electrode assembly prepared according to Example 1.
Figure 3B:
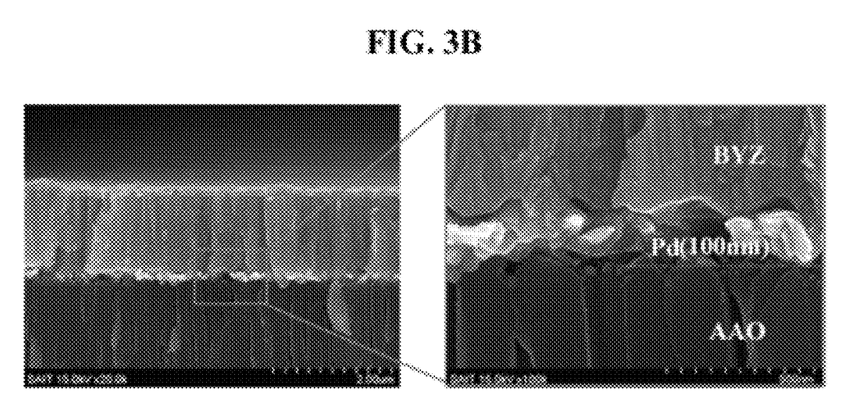
FIG. 3B is an SEM image of a cross-section of a membrane electrode assembly prepared according to Example 3.

As shown in FIGS. 3A and 3B, there is no defect in the Pd thin film having a thickness of 100 nm and 400 nm in the membrane electrode assemblies according to Examples 1 and 3.

Evaluation Example 2

Measurement of Surface RMS Roughness

Figure 4A:
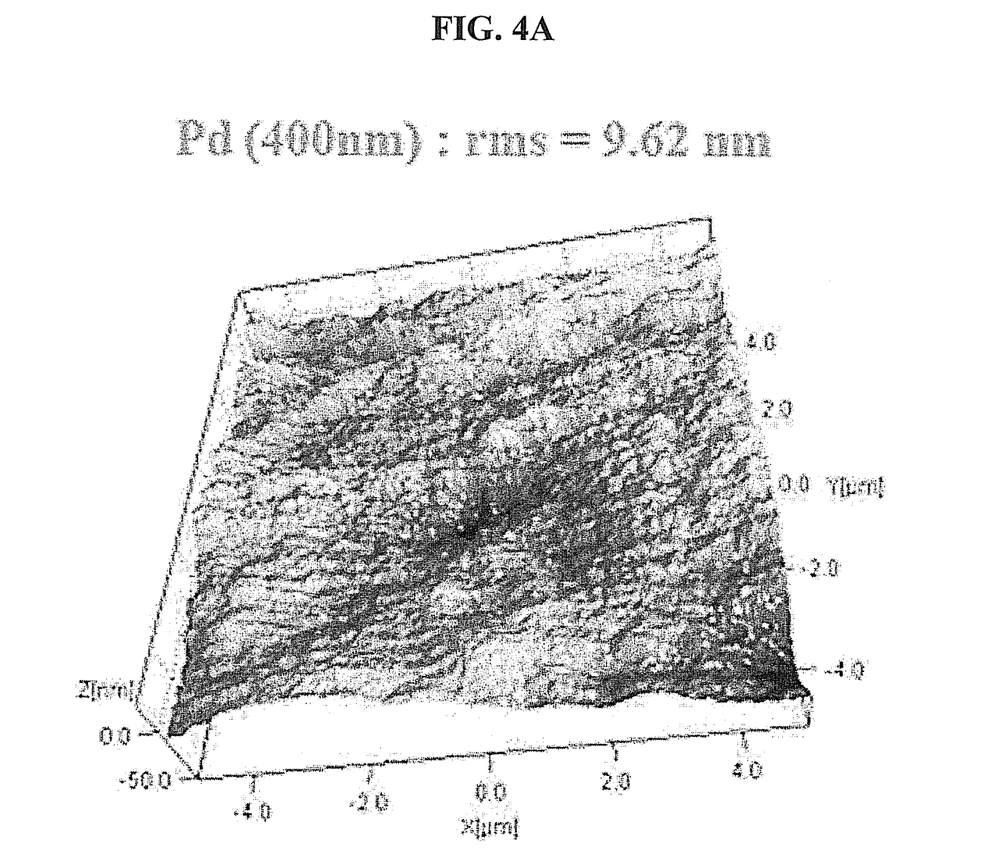
FIG. 4A is an atomic force microscopic (AFM) image of the surface of a Pd thin film prepared according to Example 1.
Figure 4B:
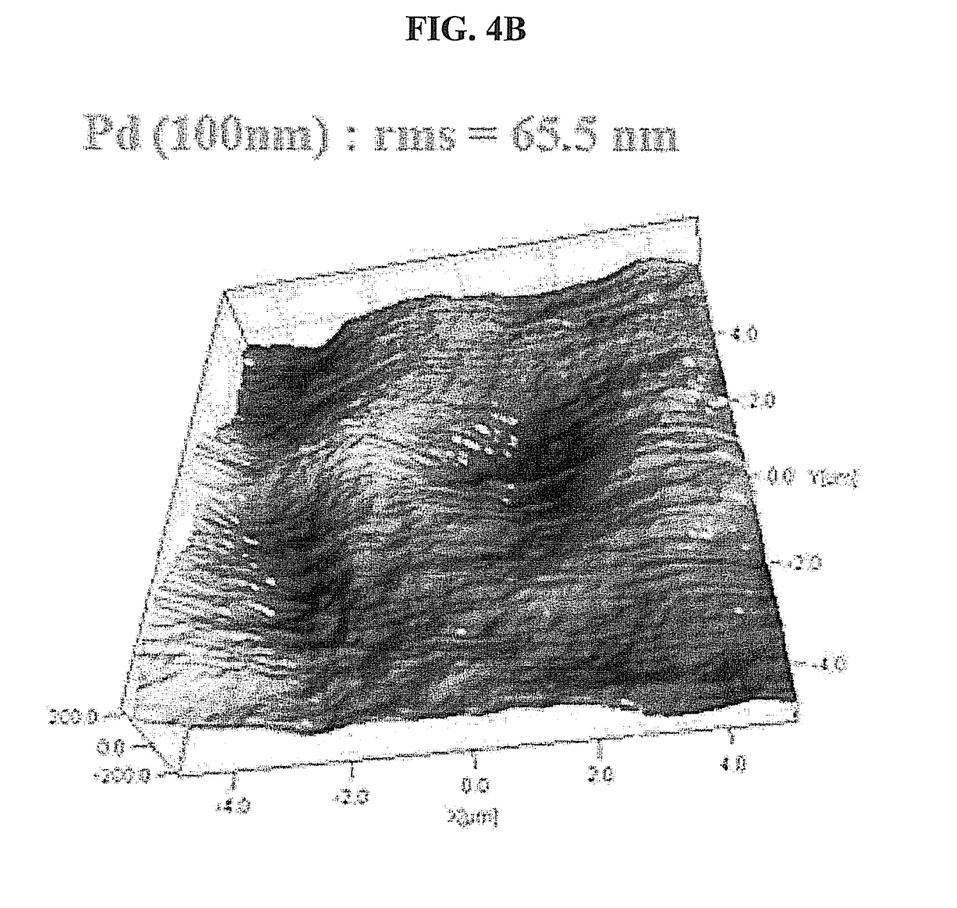
FIG. 4B is an AFM image of the surface of a Pd thin film prepared according to Example 3.

In Examples 1 and 3, after the Pd thin film anode was deposited on the porous substrate, the surface of the Pd thin film was scanned using an atomic force microscope (AFM) to measure the surface root mean square (RMS) roughness. FIGS. 4A and 4B respectively show the surfaces of the porous substrates according to Examples 1 and 3. The RMS roughness is calculated according to Equations 1 and 2 below.

$$S_q = \sqrt{\frac{1}{MN} \sum_{k=0}^{M-1} \sum_{l=0}^{N-1} [z(x_k, y_l) - \mu]^2} \quad \text{Equation 1}$$

$$\mu = \frac{1}{MN} \sum_{k=0}^{M-1} \sum_{l=0}^{N-1} z(x_k, y_l) \quad \text{Equation 2}$$

In Equation 1, $S_q$ refers to the RMS roughness, p is average height, and z is the height at a specific plane coordinates (x,y).

Using these equations, the surface RMS roughness of the Pd thin film according to Example 1 was 9.62 nm, and the surface RMS roughness of the Pd thin film according to Example 3 was 65.5 nm.

Evaluation Example 3

Evaluation of Cell Performance

Cell performance of the membrane electrode assemblies prepared according to Examples 1 and 13 was measured, and the results are shown in Table 1 below and FIGS. 5A and 5B.

TABLE 1

|  | Open circuit voltage [V] | Maximum power density [mW/cm$^2$] |
|---|---|---|
| Example 1 | 1.0 | 4.6 |
| Example 13 | 0.97 | 9.1 |

Figure 5A:
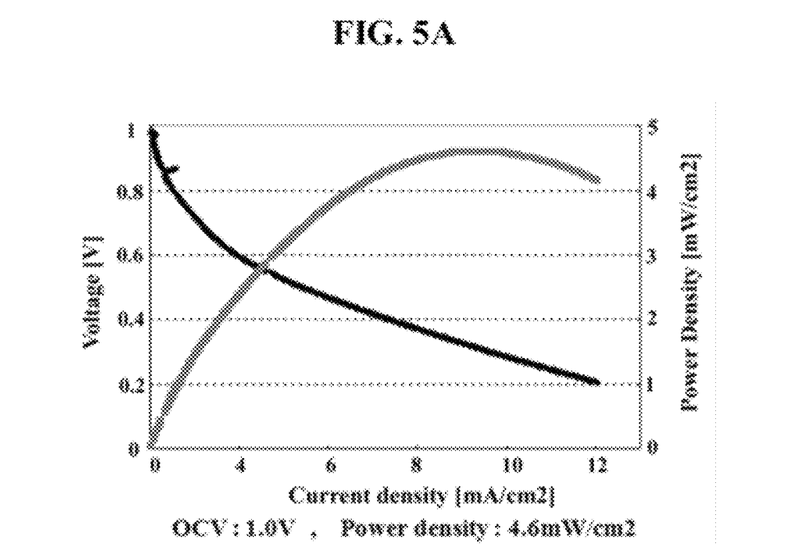
FIG. 5A is a graph illustrating cell performance of a membrane electrode assembly prepared according to Example 1.
Figure 5B:
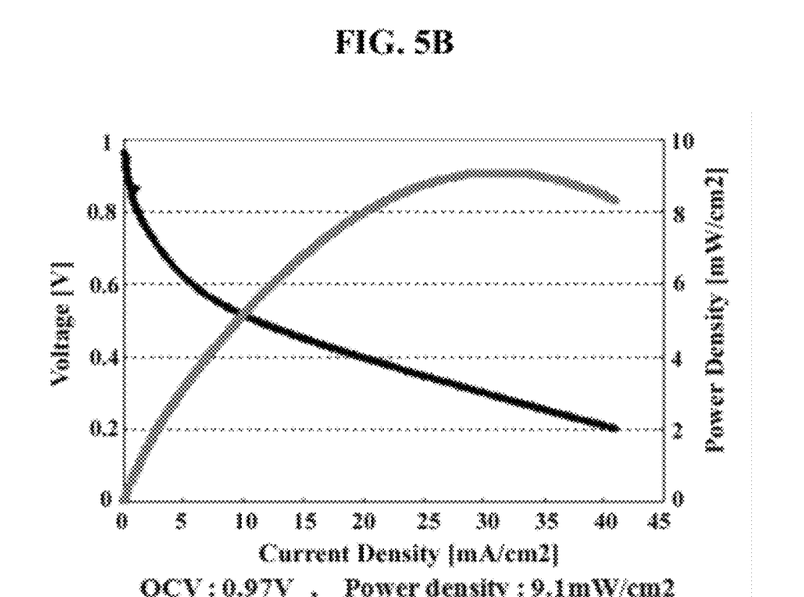
FIG. 5B is a graph illustrating cell performance of a membrane electrode assembly prepared according to Example 13.

As shown in Table 1 and FIGS. 5A and 5B, the open circuit voltage (OCV) (black curve) and the power density (gray curve) of the membrane electrode assemblies prepared according to Examples 1 and 13 were respectively about 1 V and equal to or greater than 4 mW/cm$^2$ at intermediate operation temperatures of 400° C.

As described above, according to the one or more of the above embodiments of the present invention, by using the membrane electrode assembly including the anode including the porous support and the hydrogen permeable metal thin film, the thickness of the solid oxide electrolyte membrane is reduced, and thus the power density of the solid oxide fuel cell may increase at an intermediate temperature.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A membrane electrode assembly comprising:
   an anode that incorporates a porous support;
   a hydrogen permeable metal or alloy thin film disposed on the porous support;
   a cathode; and
   a proton conductive solid oxide electrolyte membrane disposed between the anode and the cathode,
   wherein the root mean square (RMS) roughness of the surface of the hydrogen permeable metal thin film is in a range of about 1 to about 100 nm.

2. The membrane electrode assembly of claim 1, wherein the thickness of the hydrogen permeable metal thin film is in a range of about 10 to about 1000 nm.

3. The membrane electrode assembly of claim 1, wherein the hydrogen permeable metal or alloy is at least one selected from the group consisting of palladium (Pd), a Pd-based alloy, niobium (Nb), a Nb-based alloy, vanadium (V), and a V-based alloy.

4. The membrane electrode assembly of claim 1, wherein the thickness of the proton conductive solid oxide electrolyte membrane is in a range of about 0.1 to about 10 μm.

5. The membrane electrode assembly of claim 1, wherein the ratio of the thickness of the proton conductive solid oxide electrolyte membrane to the thickness of the hydrogen permeable metal thin film is equal to or greater than 1.5:1, and the thickness of the hydrogen permeable metal thin film is equal to or greater than 400 nm.

6. The membrane electrode assembly of claim 1, wherein the ratio of the thickness of the proton conductive solid oxide electrolyte membrane to the thickness of the hydrogen permeable metal thin film is equal to or greater than 6:1, and the thickness of the hydrogen permeable metal thin film is equal to or greater than 200 nm.

7. The membrane electrode assembly of claim 1, wherein the ratio of the thickness of the proton conductive solid oxide electrolyte membrane to the thickness of the hydrogen permeable metal thin film is equal to or greater than 12:1, and the thickness of the hydrogen permeable metal thin film is equal to or greater than 100 nm.

8. The membrane electrode assembly of claim 1, wherein the proton conductive solid oxide is at least one oxide selected from the group consisting of zeolite substituted with proton; β-alumina; silicon oxide doped with a bivalent or trivalent cation; and barium zirconate, barium cerate, strontium cerate, or strontium zirconate doped with a bivalent or trivalent cation.

9. The membrane electrode assembly of claim 1, wherein the proton conductive solid oxide is yittria doped barium zirconate (BYZ).

10. The membrane electrode assembly of claim 1, wherein the diameter of pores of the porous support is in a range of about 10 to about 100 nm.

11. The membrane electrode assembly of claim 1, wherein the thickness of the porous support is equal to or greater than 10 μm.

12. The membrane electrode assembly of claim 1, wherein the porous support is formed of an anodic aluminum oxide (AAO).

13. The membrane electrode assembly of claim 1, further comprising a catalyst layer between the anode and the proton conductive solid oxide electrolyte membrane.

14. The membrane electrode assembly of claim 13, wherein the catalyst is at least one material selected from the group consisting of at least one metal catalyst selected from the group consisting of platinum (Pt), ruthenium (Ru), nickel (Ni), palladium (Pd), gold (Au), and silver (Ag); at least one oxide catalyst selected from the group consisting of $La_{1-x}Sr_xMnO_3$ (0<x<1), $La_{1-x}Sr_xCoO_3$ (0<x<1), and $La_{1-x}Sr_xCo_{1-y}FeO_3$ (0<x<1, 0<y<1); and alloys thereof.

15. The membrane electrode assembly of claim 1, wherein the cathode is at least one selected from the group consisting of: platinum (Pt); nickel (Ni); palladium (Pd); silver (Ag); perovskite doped with at least one metal selected from the group consisting of lanthanum (La), strontium (Sr), barium (Ba), and cobalt (Co); zirconia doped with yttrium (Y) or scandium (Sc); ceria doped with at least one rare earth selected from the group consisting of gadolinium, samarium, lanthanium, ytterbium, and neodymium; at least one proton conductive metal comprising Pd, Pd—Ag alloy, and vanadium (V); zeolite; strontium manganate doped with lanthanum (La) (LSM), calcium manganate doped with lanthanum (LCM), and lanthanum strontium cobalt ferrite (LSCF).

16. The membrane electrode assembly of claim 1, wherein the thickness of the cathode is equal to or less than 1 μm.

17. A solid oxide fuel cell comprising a membrane electrode assembly according to claim 1.

18. A method of preparing a membrane electrode assembly, the method comprising:
forming an anode by disposing a hydrogen permeable metal thin film on a porous support;
disposing a solid oxide electrolyte membrane on the hydrogen permeable metal thin film; and
disposing a cathode on the solid oxide electrolyte membrane,
wherein the root mean square (RMS) roughness of the surface of the hydrogen permeable metal thin film is in a range of about 1 to about 100 nm.

19. The method of claim 18, wherein the cathode, the hydrogen permeable metal thin film, and the solid oxide electrolyte membrane are each independently deposited using at least one method selected from the group consisting of sputtering, chemical vapor deposition, physical vapor deposition, atomic layer deposition, pulsed laser deposition, molecular beam epitaxy, and vacuum deposition.

20. The method of claim 18, further comprising disposing a catalyst layer on the hydrogen permeable metal thin film.

21. The method of claim 20, wherein the catalyst is deposited using at least one method selected from the group consisting of sputtering, chemical vapor deposition, physical vapor deposition, atomic layer deposition, plating, pulsed laser deposition, molecular beam epitaxy, and vacuum deposition.

22. The method of claim 18, wherein the thickness of the hydrogen permeable metal thin film is in the range of about 10 to about 1000 nm.

23. The method of claim 18, wherein the hydrogen permeable metal comprises at least one metal or alloy selected from the group consisting of palladium (Pd), a Pd-based alloy, niobium (Nb), a Nb-based alloy, vanadium (V), and a V-based alloy.

24. The method of claim 18, wherein the thickness of the proton conductive solid oxide electrolyte membrane is in a range of about 0.1 to about 10 μm.

25. The method of claim 18, wherein the diameter of pores of the porous support is in a range of about 10 to about 100 nm.

* * * * *